United States Patent Office 3,232,902
Patented Feb. 1, 1966

3,232,902
THERMOPLASTIC COMPOSITIONS ON THE BASIS OF STYRENE, BUTADIENE, ACRYLONITRILE AND DIMETHYL-ITACONATE COPOLYMERS
Vito Maroni, Milan, Italy, assignor to L.I.R.C. Laboratori Italiani di Ricerca Chimica, Milan, Italy, a joint-stock company of Italy
No Drawing. Filed July 3, 1962, Ser. No. 207,375
Claims priority, application Italy, Sept. 20, 1961, 16,978/61
8 Claims. (Cl. 260—31.2)

This invention relates to particular plastic compositions, on the basis of styrene, butadiene, acrylonitrile and dimethyl-itaconate, and which show improved properties of resiliency, hardness, stiffness and heat-stability. According to procedures heretofore known, an attempt has been made to have the superior resilience of butadiene-acrylonitrile copolymers (BN) combined with the very good heat and mechanical properties of styrene-acrylonitrile copolymers (SN).

The above purpose has been successfully attained by having all three monomers (styrene, butadiene and acrylonitrile) copolymerized together, or—in a more general way—by mixing together both copolymers SN and BN previously obtained.

However, by the above procedure, it has not been possible to obtain a mixture having a high resilience combined with a very good hardness and heat-resistance, since according to the ratio of BN to SN selected for the mixture, there may be a high resilience and a poor hardness and heat-resistance, or vice versa.

One object of this invention is to provide a mixture or composition featuring remarkably improved mechanical and heat properties (for instance hardness, resilience, stiffness).

A further object of this invention is the provision of a compound, or a mixture of compounds which can be moulded more easily by the conventional injection moulding procedures.

Another object of this invention is to allow the obtaining from the compound or compound mixture according to the invention, of moulded articles showing a surface finish better than that of the articles moulded from the conventional shock-resisting materials. In particular, when the compositions according to the invention are used as starting materials, the articles formed therewith do not show the stripes otherwise present near the injection nozzle, when the conventional shock-resisting materials are used.

According to the invention, it has been amazingly found that the above purposes can be attained by utilizing, as starting materials, thermoplastic compositions containing one or more copolymers of styrene, butadiene and acrylonitrile, and which are characterized in that dimethyl-itaconate is present in at least one of said copolymers.

The objects stated above can be attained by copolymerizing the four monomers, i.e. styrene, butadiene, acrylonitrile and dimethyl-itaconate, or by mixing a BN-latex with an emulsion of a styrene-acrylonitrile-dimethyl-itaconate copolymer.

However, a more general way of bringing this invention into practice, is that of making a homogenized mixture of copolymers in the proportions of 10–40 percent of a butadiene-acrylonitrile copolymer (containing 50–80 percent of butadiene) to 60–90 percent of a styrene-acrylonitrile-dimethyl-itaconate copolymer, the latter copolymers consist of 5–20 percent dimethyl-itaconate, 10–30 percent of acrylonitrile, and 50–85 percent of styrene.

The mixing of the above components can be made in a Banbury mill, at temperatures ranging from 100° C. up to 200° C., and preferably from 140 to 180° C.

However, other known types of mixers for instance, roller mixer, drawplates and the like—are also suitable for the purpose above.

To make the mixing more easy, a lubricant is added to the mixture in the proportions of 1½–2½ percent. Such lubricant can be selected, for instance, from the group consisting of esters and/or salts of long chain fatty acid. An antioxidizing compound, selected from the group consisting of polysubstituted phenols, is also added in the proportions of 0.5–1.5 percent, based on the BN copolymers. To better illustrate the invention, the following, non restrictive examples are given.

The first two of such examples, are based on conventional shock-resisting products, on the basis of SN and BN, and are designed to serve as a comparison with the products obtained according to this invention (examples 3, 4 and 5).

EXAMPLE 1

72 parts of a styrene-acrylonitrile copolymer (containing 70 percent of styrene) and 28 parts of a butadiene-acrylonitrile copolymer (containing 60 percent of butadiene) are homogeneously mixed together in a Banbury mixer, at a temperature of 150°–180° C.

The product thus obtained is granulated as usually in a granulating machine. Test pieces moulded therefrom had the following properties:

Izod test on notched test piece (ASTM-D256)
 kg. cm./sq. cm__ 20–25
Rockwell hardness, R scale (ASTM-D785) ____ 94
Heat distortion (ASTM-D648) _____ ° C__ 78–80
Modulus of elasticity (ASTM-D638)
 kg./sq.cm__ 18,000

EXAMPLE 2

80 parts of styrene-acrylonitrile polymer (containing 70 percent of styrene) and 20 parts of a butadiene-acrylonitrile copolymer (containing 60 percent of butadiene) are homogeneously mixed together by the same procedure of Example 1.

The physical properties of the product obtained as above are as follows:
Izod test on notched test piece
 kg. cm./sq. cm__ 3
Rockwell hardness (R scale) _____ 104–105
Heat distortion _____°C__ 83
Modulus of elasticity _____kg./sq. cm__ 22,000

EXAMPLE 3

20 parts of a butadiene-acrylonitrile copolymer (containing 60 percent of butadiene) and (80 parts of styrene-acrylonitrile-dimethyl-itaconate copolymer (containing respectively 70 percent–20 percent–10 percent of said components) are homogeneously mixed together by the same procedure as outlined in the preceding examples, adding moreover 2 parts of butyl stearate as lubricant, and 0.2 parts of ditertiary-butyl-p-cresol as an antioxidizing compound.

The physical properties of the product obtained as above, are as follows:

Izod test on notched test piece__kg. cm./sq. cm__ 24
Rockwell hardness (R Scale) _____ 107
Modulus of elasticity_____kg./sq. cm__ 25,000
Heat distortion _____°C__ 92

EXAMPLE 4

20 parts of a butadiene-acrylonitrile copolymer (containing 60 percent of butadiene) and 80 parts of a styrene-acrylonitrile-dimethyl-itaconate copolymer (containing respectively 65 percent–30 percent–5 percent of said components) are homogeneously mixed together by the same procedure as outlined in the preceding examples, and adding 2.5 percent of lubricant and 0.05 percent of an anti-oxidant compound (calculated on the total charge weight) before mixing.

The physical properties of the product obtained as above, are as follows:

| | |
|---|---:|
| Izod test on notched test piece__kg. cm./sq. cm__ | 12 |
| Rockwell hardness (R scale) | 108 |
| Heat distortion_____°C__ | 100 |
| Modulus of elasticity_____kg./sq. cm__ | 26,000 |

EXAMPLE 5

The compositions obtained according to Examples 3 and 4, have been extruded into tubes and plates, at temperatures in the range of 180°–250° C. Such tubes and plates have shown a uniform finish, without stripes.

Other components, as for instance dashboards, moulded in an injection moulding machine, have also shown a very good and translucent finish, without any stripes, not even near the injection nozzle.

EXAMPLE 6

| | Parts by weight |
|---|---:|
| Butadiene-acrylonitrile copolymer (containing 70% of butadiene) | 10 |
| Ternary copolymer (styrene 70%, acrylonitrile 20% dimethylitaconate 10%) | 90 |
| Total | 100 |

(9% of which is dimethylitaconate)

EXAMPLE 7

| | Parts by weight |
|---|---:|
| Butadiene-acrylonitrile copolymer as in Example 6 | 40 |
| Ternary copolymer as in Example 6 | 60 |
| Total | 100 |

(6% of which is dimethylitaconate)

*Mechanical properties of samples according to Examples 6 and 7*

| | Example 6 | Example 7 |
|---|---|---|
| Impact strength (Izod test on notched sample ASTM-D 256) kg. cm./cm. | 5–8 | 45–50 |
| Rockwell hardness (R scale, ASTM-D 785) | 120–122 | 90–95 |
| Heat distortion temperature (ASTM-D 648 ° C.) | 92–95 | 80–84 |
| Modulus of elasticity (ASTM-D638), kg./sq. cm | 30.000–32.000 | 18.000–20.000 |

Physical properties concerning the material of Example 6, show high values of hardness and of heat distortion temperature. The modulus of elasticity is very high, whereas the impact strength appears to be rather low. It is believed that such properties are in relation to the high content of ternary copolymer in such composition. The low percentage of the rubbery copolymer containing butadiene is responsible for the low impact strength.

Substantially higher amounts of the butadiene copolymer in composition of Example 7, produces a very strong impact strength, but limits the values of the hardness and the heat distortion temperature to a level common to such compounds. As a result it is believed that the critical range of composition specified hereinbefore should not be exceeded, though positive advantages can be achieved by shifting the composition within such critical range.

What I claim is:

1. A composite thermoplastic composition consisting of a lubricant, an anti-oxidizing agent and a major portion of a homogeneous mixture of first butadiene-acrylonitrile copolymer including 60% by weight of butadiene, and a second ternary styrene-acrylonitrile-dimethylitaconate copolymer consisting of 65 to 70% of styrene, 20 to 30% of acrylonitrile, and only 5 to 10% of dimethyl-itaconate, the said mixture consisting of 20% of the said first copolymer and 80% of the said second ternary copolymer, said lubricant being a substance selected from the group consisting of esters and salts of long chain fatty acids in an amount not over 2.5% of said mixture, said anti-oxidizing compound consisting of a polysubstituted phenol in an amount not over 1.5% of said first copolymer.

2. A composite thermoplastic composition consisting of a lubricant, an anti-oxidizing agent and a major portion of a homogeneous mixture of a first butadiene-acrylonitrile copolymer including 60% by weight of butadiene and a second ternary styrene-acrylonitrile-dimethylitaconate copolymer consisting of 65 to 70% of styrene, 20 to 30% of acrylonitrile, and only 5 to 10% of dimethylitaconate, the said composition consisting of 10 to 40% of the said first copolymer and 60 to 90% of the said second ternary copolymer, said lubricant being a substance selected from the group constituting of esters and salts of long chain fatty acids in an amount not over 2.5% of said mixture, said antioxidizing compound consisting of a polysubstituted phenol in an amount not over 1.5% of said first copolymer.

3. A composite thermoplastic composition consisting of a major portion of a homogeneous mixture of a first butadiene-acrylonitrile copolymer including 60% by weight of butadiene and a second ternary styrene-acrylonitrile-dimethylitaconate copolymer consisting of 65 to 70 percent of styrene, 20% to 30% of acrylonitrile, and only 5 to 10% of dimethylitaconate, the said composition consisting of 10 to 40% of the said first copolymer and of 60 to 90% of the said second ternary copolymer.

4. A composite thermoplastic composition consisting of a major portion of a homogeneous mixture of a first butadiene-acrylonitrile copolymer and a second ternary styrene-acrylonitrile-dimethylitaconate copolymer consisting of 65 to 70% of styrene, 20 to 30% of acrylonitrile and only 5 to 10% of dimethylitaconate, the said composition including from 10 to 20% by weight of said first copolymer and 80 to 90% of the said ternary copolymer.

5. A method of producing a composite thermoplastic composition comprising homogeneously mixing at a temperature between 150° and 180° C. a first butadiene-acrylonitrile copolymer including 60% by weight of butadiene, and a second ternary styrene-acrylonitrile-dimethylitaconate copolymer consisting of 65 to 70% of styrene, 20 to 30% of acrylonitrile, and 5 to 10% of dimethyl-itaconate, the quantity of dimethyl-itaconate being such as to confer high heat resistance, high hardness, high impact strength and great stiffness to the composite composition, the first copolymer being added in an amount 10 to 40% by weight while the second copolymer is added in an amount of 60 to 90% by weight.

6. A method as claimed in claim 5 wherein said first copolymer is added in an amount 20% by weight and the second copolymer is added in an amount 80% by weight.

7. A method as claimed in claim 5 comprising adding to the mixture of copolymers a lubricant selected from the group consisting of esters and salts of long chain fatty acids in an amount less than 2.5% by weight of said mixture.

8. A method as claimed in claim 5 comprising adding to the mixture of copolymers a lubricant selected from the group consisting of esters and salts of long chain fatty acids in an amount less than 2.5% by weight of said mixture, and an anti-oxidizing compound consisting of a polysubstituted phenol in an amount less than 1.5% by weight of said first copolymer.

References Cited by the Examiner

UNITED STATES PATENTS 2,439,202  4/1948  Daly _____ 260—45.5

FOREIGN PATENTS 597,879  5/1960  Canada.
804,956  11/1958  Great Britain.
897,839  5/1962  Great Britain.

OTHER REFERENCES

Condorelli et al., "Thermoplastic Transparent Copolymers From Derivatives of an Acid Obtained by Fermentation," Poliplasti, 8, No. 40, 3–7 (1960) (referred to in Chem. Abs. vol. 56, 15, 668g).

MORRIS LIEBMAN, Primary Examiner.

ALEXANDER H. BRODMERKEL, Examiner.

L. T. JACOBS, Assistant Examiner.